United States Patent
Roberts

(10) Patent No.: US 8,454,841 B2
(45) Date of Patent: Jun. 4, 2013

(54) METHOD OF FILTERING WATER OR WASTEWATER

(75) Inventor: R. Lee Roberts, Rose Valley, PA (US)

(73) Assignee: Roberts Marketing DE, Inc., Wilmington, DE (US)

(*) Notice: Subject to any disclaimer, the term of this patent is extended or adjusted under 35 U.S.C. 154(b) by 258 days.

(21) Appl. No.: 12/926,968

(22) Filed: Dec. 21, 2010

(65) Prior Publication Data

US 2011/0278238 A1 Nov. 17, 2011

Related U.S. Application Data

(63) Continuation-in-part of application No. 12/662,897, filed on May 11, 2010, now Pat. No. 8,317,036.

(51) Int. Cl.
*B01D 37/00* (2006.01)

(52) U.S. Cl.
USPC ............ 210/785; 210/786; 210/795; 210/796

(58) Field of Classification Search
USPC ................. 210/263, 269, 273, 274, 279, 280, 210/785, 786, 795, 796
See application file for complete search history.

(56) References Cited

U.S. PATENT DOCUMENTS

| | | | | |
|---|---|---|---|---|
| 3,402,126 | A | * | 9/1968 | Cioffi .............................. 521/26 |
| 4,486,307 | A | * | 12/1984 | Weiler .......................... 210/275 |
| 4,976,873 | A | * | 12/1990 | Ross ............................. 210/744 |
| 5,198,124 | A | | 3/1993 | Kim et al. |
| 5,673,481 | A | | 10/1997 | Roberts et al. |
| 5,980,755 | A | | 11/1999 | Roberts et al. |
| 8,317,036 | B2 | * | 11/2012 | Roberts ........................ 210/521 |

FOREIGN PATENT DOCUMENTS

| | | |
|---|---|---|
| FR | 1052727 | 1/1954 |
| FR | 2373319 | 7/1978 |
| GB | 2151153 | 7/1985 |

OTHER PUBLICATIONS

EPO Search Report dated Aug. 23, 2012, pp. 1 to 8.

* cited by examiner

*Primary Examiner* — Matthew O Savage
(74) *Attorney, Agent, or Firm* — Merek, Blackmon & Voorhees, LLC

(57) ABSTRACT

A filter for removing at least some impurities (e.g. foreign matter of any nature including a solid, a liquid or a gas) from water or wastewater. A vibrator operably associated with at least a portion of the filter for imparting a vibrational force to enhance any one or more of numerous aspects of the filtration process including: (i) installation of the filter and/or various components thereof; (ii) servicing of the filter and/or components thereof; and, (iii) operation of the filter during a filtration cycle and a cleaning cycle.

11 Claims, 6 Drawing Sheets

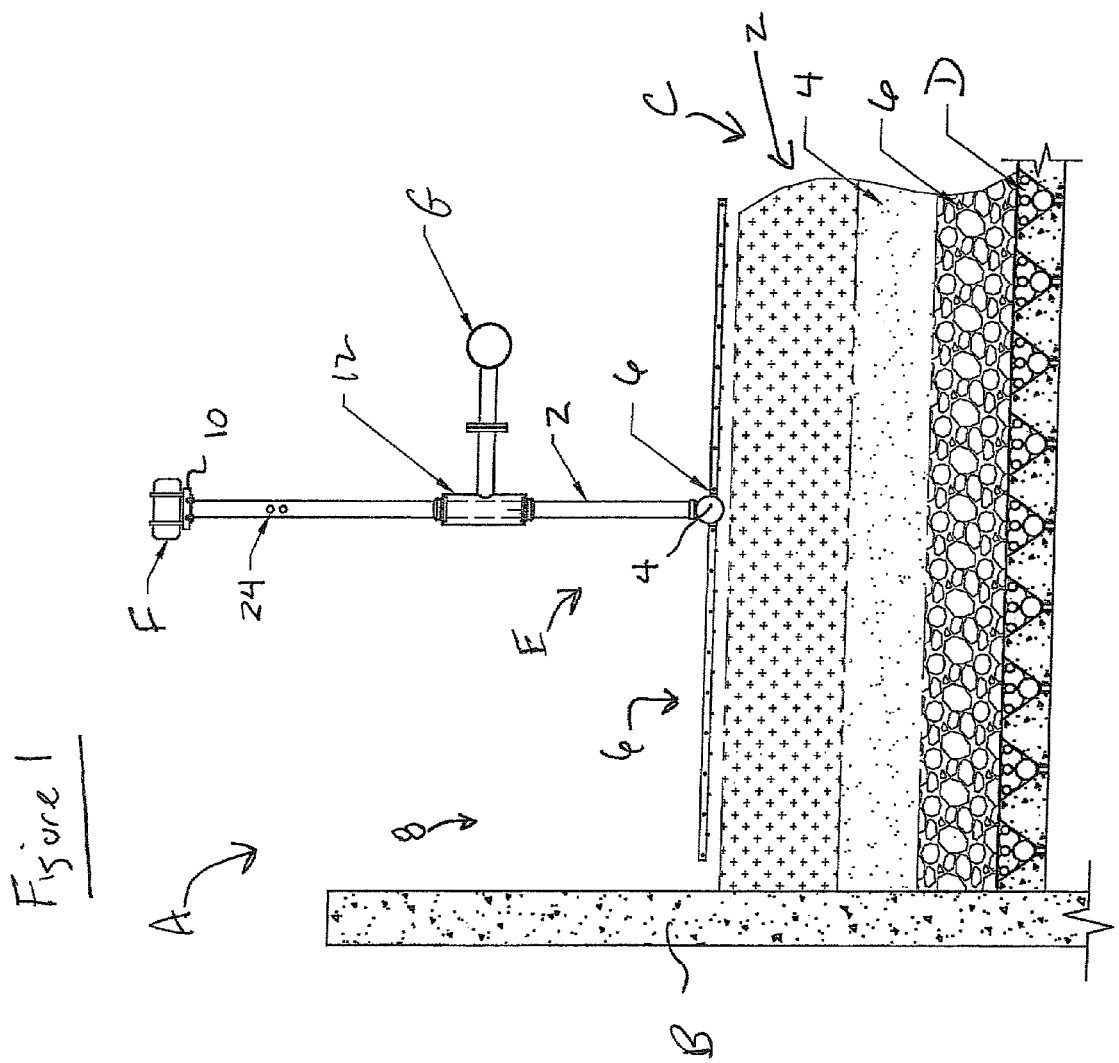

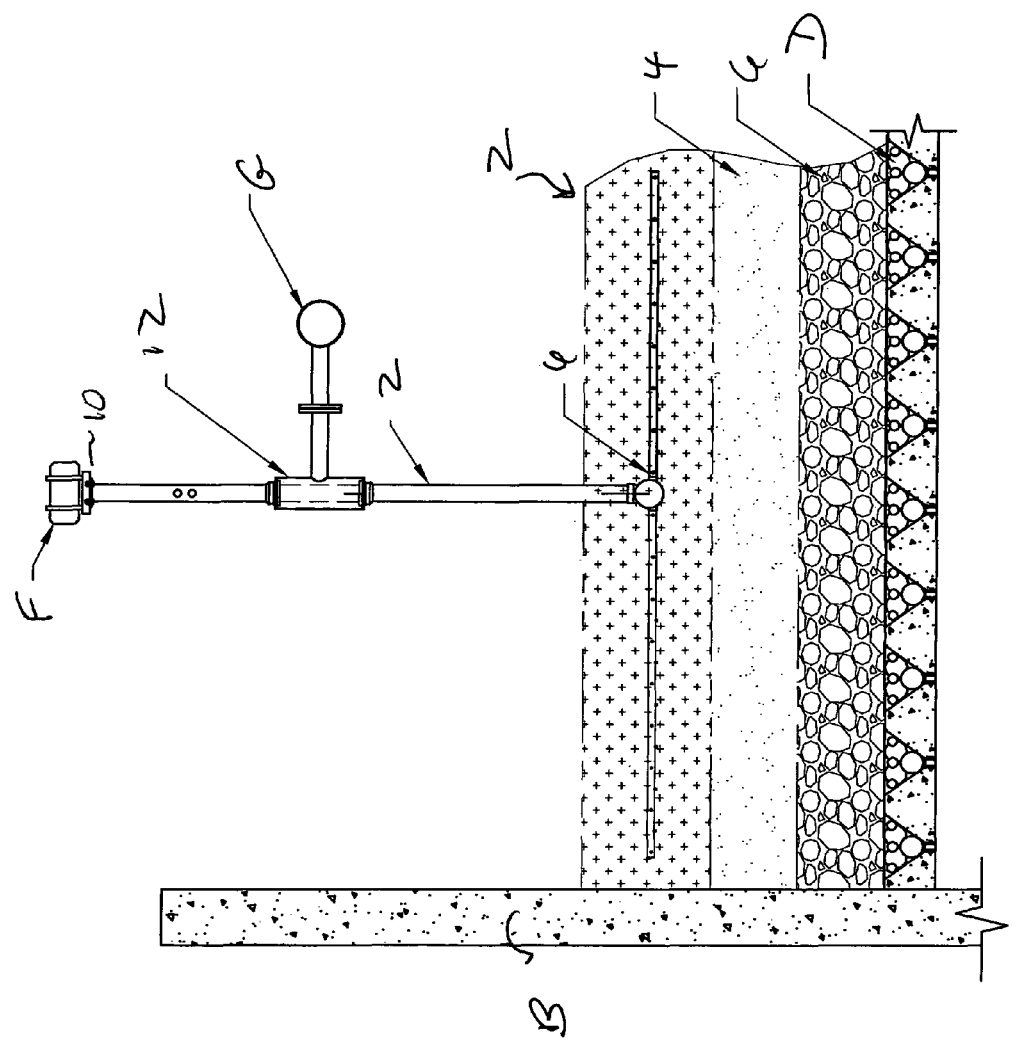

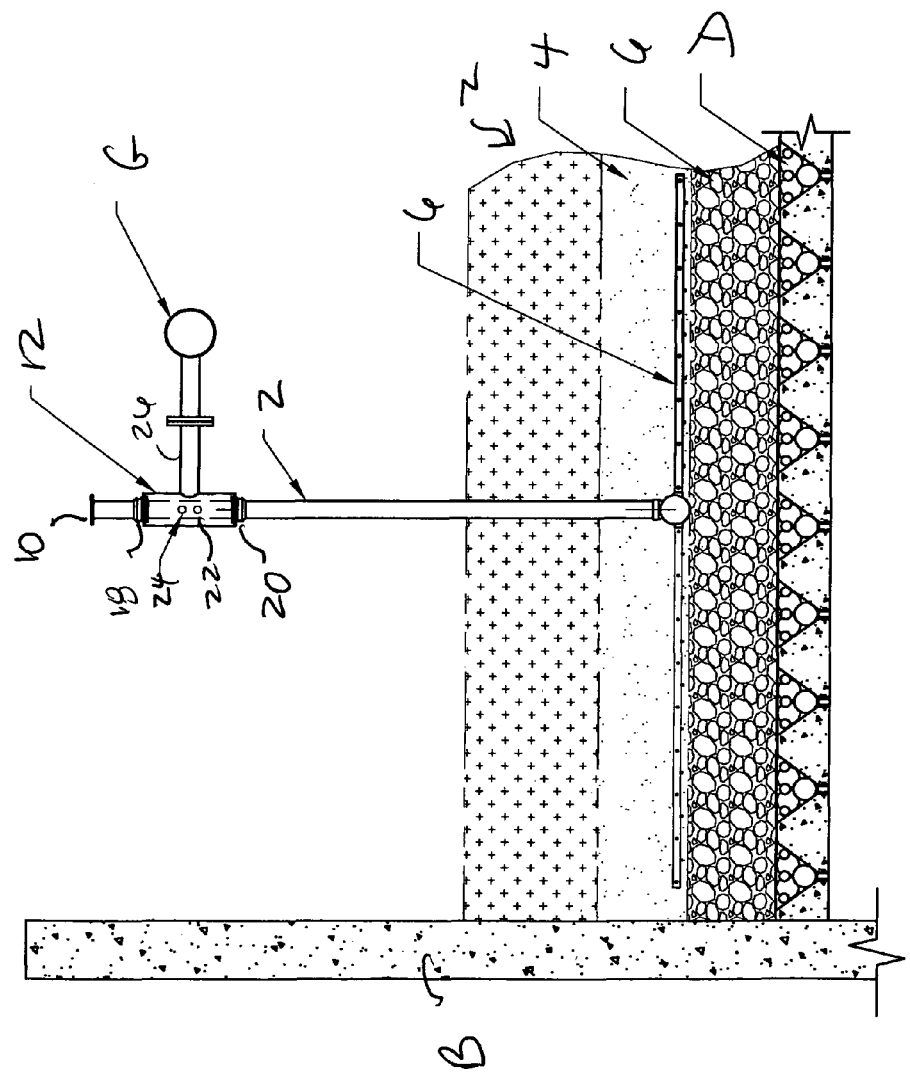

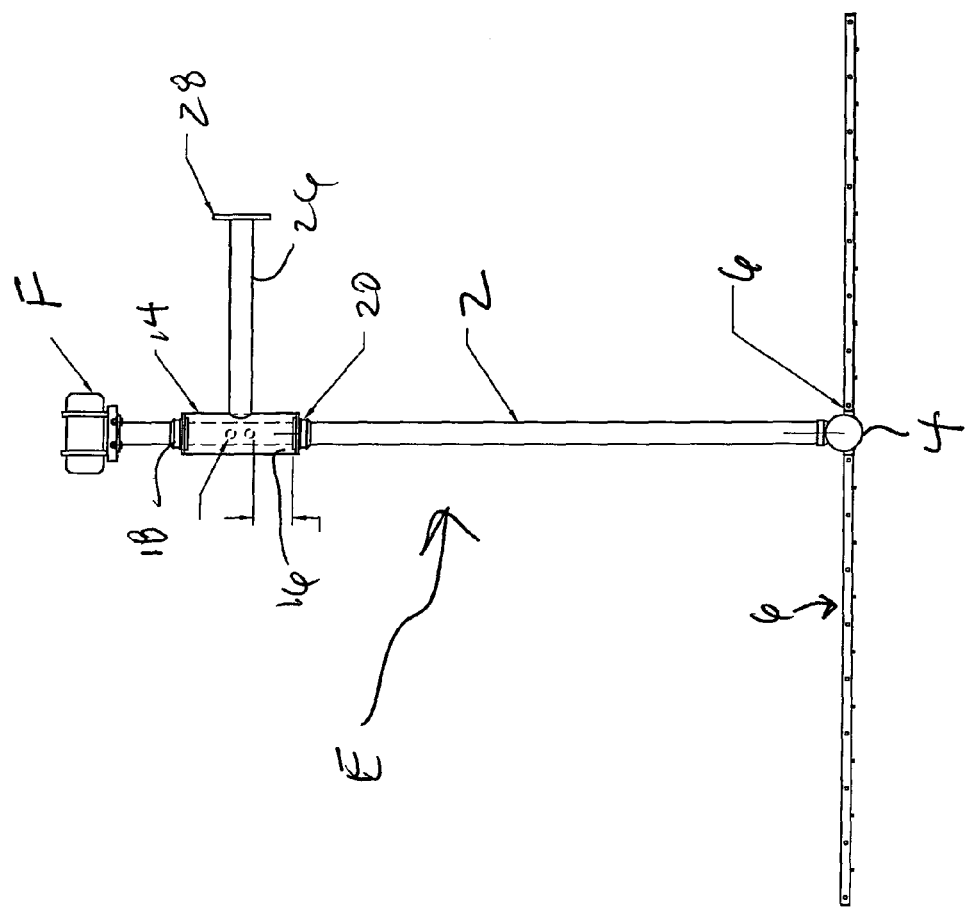

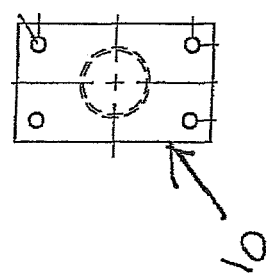
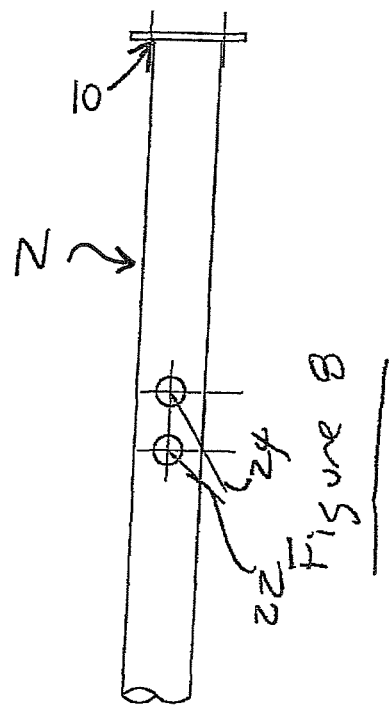

METHOD OF FILTERING WATER OR WASTEWATER

RELATED PATENT APPLICATION

The subject patent application is a continuation-in-part of U.S. patent application Ser. No. 12/662,897 filed on May 11, 2010, now U.S. Pat. No. 8,317,036, the entire contents of which are incorporated herein by reference.

FIELD OF THE INVENTION

The present invention is directed to an apparatus and method for removing impurities from water and/or wastewater. More specifically, the present invention is directed to a filter having a filter compartment in which influent is passed to remove impurities from water or wastewater and a vibrator operably associated with the filter compartment for imparting a vibrational force to the filter compartment. Preferably, the vibrator can be used to enhance any one or more of numerous aspects of the filtration process including: (i) installation of the filter and/or various components thereof; (ii) servicing of the filter and/or components thereof; and, (iii) operation of the filter during a filtration cycle and a cleaning cycle.

BACKGROUND OF THE INVENTION

Various filters have been employed to remove at least some impurities from water or wastewater. Prior filters include but are not limited to upflow filters or upflow clarifiers, downflow filters, bi-flow filters and aerators. The present invention is directed to a filter of any suitable type and a vibrator operably associated therewith to enhance any one or more of numerous aspects of the filtration process including: (i) installation of the filter and/or various components thereof; (ii) servicing of the filter and/or components thereof; and, (iii) operation of the filter during a filtration cycle and a cleaning cycle.

By way of example only and not limitation, filters having granular beds have employed air scour devices to improve cleaning of the granular filter bed. U.S. Pat. Nos. 5,534,202 and 5,673,481 disclose, inter alia, a known method of inserting an air grid into a filter bed. Specifically, these patents disclose fluidizing the filter bed to permit insertion of the air grid in the filter bed without removing filter media from the filter bed. While this was a significant improvement over prior systems, there are instances where fluidization of the filter bed is not practical and/or possible. One aspect of a preferred embodiment of the present invention is to use a vibrator to insert an air grid into a filter bed without fluidizing the filter bed and without removing filter media from the filter bed. It is important to note that the present invention is not limited to the use of a vibrator operably associated with a filter to insert an air grid into a filter bed. Rather, the present invention includes operably associating a vibrator with a filter to enhance any one or more of numerous aspects of the filtration process including: (i) installation of the filter and/or various components thereof; (ii) servicing of the filter and/or components thereof; and, (iii) operation of the filter during a filtration cycle and a cleaning cycle. This would include for example, using the vibrator to insert other elements into a filter bed without fluidizing the filter bed including but not limited to monitors for monitoring one or more conditions of a filter of the type disclosed in U.S. Pat. Nos. 5,980,755 and 6,159,384. The present invention further includes but is not limited to operating a vibrator such that the vibrator imparts a vibrational force to the filter during at least a portion of the filtration cycle to improve particle to particle contact so that particles to be filtered can agglomerate. The present invention further includes but is not limited to operating the vibrator during at least a portion of a cleaning cycle to enhance agitation of the filtering element be it a granular bed, settling tubes, settling plates, membranes or other type of filter element to improve cleaning of the filter element.

OBJECTS AND SUMMARY OF THE INVENTION

An object of the present invention is to provide a novel and unobvious apparatus and method for removing impurities from water and/or wastewater.

Another object of a preferred embodiment of the present invention is to provide a suitable filter with a vibrator to enhance any one or more of numerous aspects of the filtration process including: (i) installation of the filter and/or various components thereof; (ii) servicing of the filter and/or components thereof; and, (iii) operation of the filter during a filtration cycle and a cleaning cycle.

Still another object of a preferred embodiment of the present invention is to provide a filter with a vibrator for imparting a vibrational force to at least a portion of a filter bed so that a component of a filter can be readily inserted into at least a portion of the filter bed without fluidizing all or a portion of the filter bed and without removing filter media from the filter bed.

A further object of a preferred embodiment of the present invention is to provide a filter with a vibrator for imparting a vibrational force during at least a portion of the filtration cycle to improve the filtration efficiency of the filtering element.

Yet another object of a preferred embodiment of the present invention is to provide a filter with a vibrator for imparting a vibrational force during at least a portion of the cleaning cycle to enhance cleaning of the filtering element Yet a further object of a preferred embodiment of the present invention is to provide a filter with an adapter to permit height adjustment of a filter component including but not limited to a fluid conduit.

Still a further object of a preferred embodiment of the present invention is to provide a filter with a vibrator for imparting a vibrational force to at least a portion of a filter bed so that a component of a filter can be readily inserted into at least a portion of the filter bed without passing any fluid through the filter bed and without removing filter media from the filter bed.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for filtering water or wastewater including a filter having a filter compartment for removing impurities from influent and a vibrator operably associated with the filter compartment for imparting a vibrational force to at least a portion of the filter compartment.

Another preferred embodiment of the present invention is directed to apparatus for filtering water or wastewater including a filter having a filter compartment including a filter bed having at least one layer of filter media for removing impurities from influent. The apparatus includes at least one fluid conduit for directing a fluid through the filter bed. At least a portion of the at least one fluid conduit is inserted in the filter bed. A vibrator is operably associated with the filter compartment for imparting a vibrational force to at least a portion of the filter bed to permit a portion of the at least one fluid conduit to be inserted into or removed from the filter bed.

A further embodiment of the present invention is directed to an apparatus for filtering water or wastewater including a filter having a filter compartment in which at least some impurities are removed from influent and an air grid disposed in the filter compartment for directing air through at least a portion of the filter compartment. The air grid includes a drop pipe, at least one header and at least one lateral. An adapter is operably associated with the drop pipe for permitting vertical adjustment of the drop pipe. The adapter forms an air chamber along a portion of the drop pipe between a first end of the drop pipe and a second end of the drop pipe. The drop pipe has at least one orifice in communication with the air chamber such that air from the air chamber can pass into the drop pipe.

Still another embodiment of the present invention is directed to a method of filtering water or wastewater including the steps of: (a) providing a filter having a filter compartment in which at least some impurities from influent are removed; (b) providing at least one vibrator; (c) operably associating the at least one vibrator with at least a portion of the filter; and, (d) transmitting a vibrational force to at least a portion of the filter.

Still a further embodiment of the present invention is directed to a method of filtering water or wastewater including the steps of: (a) providing a filter, the filter including a filter bed in which at least some impurities from influent are removed and a conduit for directing a fluid through at least a portion of the filter bed; (b) providing at least one vibrator; (c) operably associating the at least one vibrator with at least a portion of the filter bed; (d) providing a component at least a portion of which is to be partially inserted in the filter bed; (d) transmitting a vibrational force to at least a portion of the filter bed while directing fluid through at least a portion of the filter bed at subfluidization velocity; and, (e) inserting at least a portion of the component into the filter bed during step (d).

BRIEF DESCRIPTION OF THE DRAWINGS

FIG. 1 is a fragmentary cross-sectional view of a preferred embodiment of the present invention depicting an air grid prior into installation into a filter bed.

FIG. 2 is a fragmentary cross-sectional view of a preferred embodiment of the present invention depicting an air grid being inserted into a filter bed.

FIG. 3 is a fragmentary cross-sectional view of a preferred embodiment of the present invention depicting an air grid subsequent to installation into a filter bed.

FIG. 4 is an elevational view of an air grid formed in accordance with a preferred embodiment of the present invention with a vibrator removably attached thereto.

FIG. 8 is a fragmentary view of a drop pipe formed in accordance with a preferred embodiment of the present invention.

FIG. 9 is a plan view of a drop pipe formed in accordance with a preferred embodiment of the present invention.

DETAILED DESCRIPTION OF THE PREFERRED EMBODIMENTS OF THE INVENTION

Figure 7:
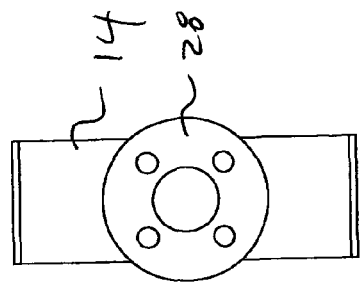
FIG. 7 is an right end view of an adapter formed in accordance with a preferred embodiment of the present invention.

The preferred forms of the invention will now be described with reference to FIGS. 1-9. The appended claims are not limited to the preferred forms and no term and/or phrase used herein is to be given a meaning other than its ordinary meaning unless it is expressly stated otherwise. Fluidization as used herein means at least 20 percent expansion of a filter bed. Sub-fluidization velocity of a fluid means a velocity of a fluid in which at least a portion of the filter bed is expanded less than 20 percent.

FIGS. 1 Through 9

Referring to FIGS. 1 to 9, a filter system A employing a preferred form of the invention is illustrated in one of many possible configurations. Filter A includes a tank B, a filter bed C, an underdrain D, an air grid system E, a vibrator F and an air supply source G. While filter A as shown in FIGS. 1 to 3 is a downflow filter (i.e., influent is passed downwardly through the filter bed C during filtration), any filter can be used including but not limited to an upflow filter, an upflow clarifier and a bi-flow filter. As used herein, the term filter refers to any device that removes at least some impurities (e.g. foreign matter of any nature including a solid, a liquid or a gas) from water or wastewater. Tank B can be formed from concrete, metal or other suitable material. Further, tank B can be rectangular, circular or any other suitable shape.

Filter bed C, as shown in FIGS. 1 to 3, includes a layer of anthracite 2 on top of a layer of sand 4 supported by a layer of gravel 6. It will be readily appreciated that any suitable-filter bed may be used including a single layer filter bed. Further, while a gravel layer 6 is depicted as supporting the layers of filter media 2 and 4 above a conventional wheeler bottom type underdrain D, the underdrain D may be any conventional type including an underdrain formed from a plurality of laterals having a porous plate connected thereto obviating the need for a gravel layer. Further, while the filter element is depicted as a granular filter bed, vibrator F can be used with any suitable filter element to enhance filtration or cleaning of the filter element. For example, the filter element can be settling plates, settling tubes or membranes.

The air gird system E includes a substantially vertically extending drop pipe 2, a substantially horizontally extending air header 4 and a plurality of substantially horizontally extending laterals 6. The air grid system can include multiple grids in filter compartment 8. The air grid system E can be of the type disclosed in U.S. Pat. Nos. 5,534,202 and 5,673,481. However, the present invention is not limited to the air grid disclosed in U.S. Pat. Nos. 5,534,202 and 5,673,481. Rather, any suitable air grid may be used. Further, the air grid may be omitted. For example, vibrator F may be used to insert other components into a filter bed including but not limited to a monitor for monitoring at least one condition of the filter. The monitors disclosed in U.S. Pat. Nos. 5,980,755 and 6,159,384 are one type of monitor that can be inserted into filter bed C using vibrator F.

In the preferred form of the present invention, the vibrator F is removably connected to a plate 10 disposed at an upper portion of drop pipe 2 to impart a vibrational force through the drop pipe 2, header 4 and the plurality of laterals 6. Plate 10 is connected to the upper end of drop pipe 2 to create a sealed upper end. A vibrational force will be imparted to the filter bed C as the laterals 6, header 4 and drop pipe 2 come into contact with filter bed C. Preferably, the vibrator F has a frequency of between 30 to 60 HZ and exerts between 400 lbs to 1,000 lbs of force to allow the air grid system E to be inserted into filter bed C as depicted in FIG. 3. One suitable vibrator is the Martin Vibration Systems Model CDH 2.5 vibrator. However, the present invention is not limited to such a vibrator. Rather, any suitable vibrator may be used.

Most preferably, the frequency of vibrator F matches the resonant frequency of the air grid system E. It should be noted that the resonant frequency of the air grid system E will vary with the configuration of the air grid, the media profile, water depth in the filter compartment 10 and other well known factors.

While the air grid system E is depicted in FIG. 3 as being installed directly above gravel layer 6, the final position of air grid system E in the granular media may be varied as desired.

In the most preferred form of the present invention, the air grid system E is at least partially inserted into the filter bed C by imparting a vibrational force to filter bed C without passing any fluid through the filter bed C and without removing media from filter bed C. This is desirable especially in those instances for example during initial installation of a filter system where a fluid source may not be available. In another preferred form of the present invention, the air grid system E or other component is at least partially inserted in filter bed C by imparting a vibrational force to filter bed C while simultaneously directing a fluid through the filter bed where the velocity of the fluid is sub-fluidization, i.e., where at least a portion of the bed does not expand more than 20 percent. This is desirable as the vibrational force necessary to insert the component in the filter bed C can be significantly reduced. Further, the sub-fluidization velocity feature may allow for considerable savings in equipment costs including costs of pumps and related components. Moreover, the application of a vibrational force in combination with the sub-fluidization velocity to the filter bed C allows for insertion of a component in a filter bed C without removing filter media in those instances where it is impractical or impossible to fluidize the filter bed. It should be noted that the fluid used with the vibrational force may be a liquid or a gas or a combination thereof. Further, the fluid may be influent, filtered water or air. Preferably, the fluid is passed upwardly through filter bed C when inserting air grid system E or other component into filter bed C.

While vibrator F is located on the top of drop pipe 2, the vibrator may be located in any suitable position including attached to or mounted on a wall of the filter compartment 8, mounted on or attached to header 4 and mounted on or attached to one or more of laterals 6. Alternatively, vibrator F could be mounted on anther element in contact with filter bed C.

Air grid system E may be removed from filter bed C for servicing or replacement by following the same procedure for inserting air gird system E into filter bed C.

Preferably, even after air grid system E is inserted into filter bed C, vibrator F is also operated during at least a portion of the filtration cycle to enhance particle to particle contact resulting in the agglomeration of impurities such that the impurities are easily trapped in the filter bed or other filter element. Specifically, the vibrational force will be transmitted to the influent passing through the filter compartment 8 enhancing particle to particle collision resulting in agglomeration of impurities. When vibrator F is not in use, it can be readily removed from drop pipe 2 and filter compartment 8.

Preferably, even after air grid system E is inserted into filter bed C, vibrator F is also operated during at least a portion of a cleaning cycle of filter bed C or other filter element to enhance agitation to aid in dislodging the impurities from filter bed C or other filter element. For example, vibrator F may be used while a liquid and/or air are passed upwardly through filter bed C. Further, operation of the vibrator F to impart a vibrational force to filter bed C could be a separate cleaning step before or after passing a fluid through filter bed C.

In the most preferred form of the present invention, drop pipe 2 is provided with an adapter 12 for permitting vertical adjustment of drop pipe 2. Adapter 12 is particularly advantageous as it allows one to readily compensate for a drop pipe or other component that is inadvertently sized incorrectly (e.g., too short or too long) without any field alteration to the size of the drop pipe 2. It should be noted that adapter 12 is optional.

Figure 5:
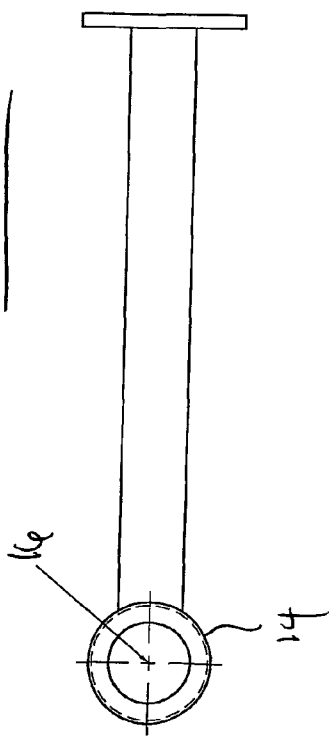
FIG. 5 is a plan view of an adapter formed in accordance with a preferred embodiment of the present invention.
Figure 6:
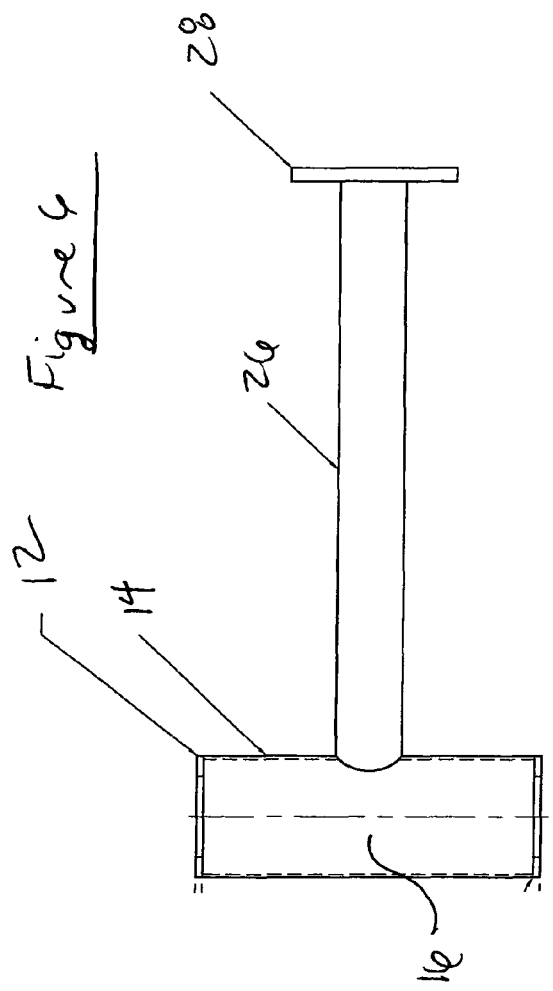
FIG. 6 is an elevation view of an adapter formed in accordance with a preferred embodiment of the present invention.

Referring to FIGS. 5 to 7, adapter 12 includes a hollow tubular member 14 having a hollow cavity 16 extending therethrough to receive drop pipe 2. Referring to FIG. 4, adapter 12 includes an upper seal 18 and a lower seal 20 to form an air chamber surrounding drop pipe 2. Preferably, as seen in FIG. 8, drop pipe 2 includes orifices 22 and 24 to permit air in the surrounding air chamber to pass through drop pipe 2, header 4 and laterals 6 into filter bed C. Adapter 12 further includes a conduit 26 in communication with cavity 16 at one end and air supply source G at the other end to convey air from the supply source G to cavity 16. A plate 28 is preferably formed at one end of conduit 26 to facilitate connection with a mating element of air supply source G.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method of filtering water or wastewater, said method comprising the steps of:
   (a) providing a filter, the filter including a filter bed in which at least some impurities from influent are removed and a conduit for directing a fluid through at least a portion of the filter bed;
   (b) providing at least one vibrator;
   (c) operably associating the at least one vibrator with at least a portion of the filter bed;
   (d) providing a component at least a portion of which is to be partially inserted in the filter bed;
   (d) transmitting a vibrational force to at least a portion of the filter bed while directing fluid through at least a portion of the filter bed at subfluidization velocity; and,
   (e) inserting at least a portion of the component into the filter bed during step (d).

2. A method as recited in claim 1, wherein:
   (a) step (d) of claim 1 is performed such that the filter bed expands less than 19 percent.

3. A method as recited in claim 1, wherein:
   (a) step (d) of claim 1 is performed such that the filter bed expands less than 10 percent.

4. A method as recited in claim 1, wherein:
   (a) step (d) of claim 1 is performed such that the filter bed expands less than 5 percent.

5. A method as recited in claim 1, further including:
   (a) operating the vibrator to vibrate an air grid such that the frequency of the vibrator is approximately equal to a resonant frequency of the air grid; and,
   (b) step (a) of this claim is performed while the air grid is being inserted in the filter bed having at least one layer of filter media.

6. A method as recited in claim 5, wherein:
   (a) during step (b) of claim 5, the vibrator imparts a force of between approximately 400 lbs to 1,000 lbs.

7. A method as recited in claim 5, wherein:
(a) said air grid includes a horizontally extending air header and a plurality of horizontally extending air laterals connected to the horizontally extending air header and step (e) of claim 1 is performed such that the horizontally extending air header and each of the plurality of horizontally extending air laterals are positioned below an upper portion of the filter bed.

8. A method as recited in claim 1, further including:
(a) operating the vibrator to vibrate said component such that the frequency of the vibrator is approximately equal to a resonant frequency of said component; and,
(b) step (a) of this claim is performed while said component is being inserted in the filter bed having at least one layer of filter media.

9. A method as recited in claim 8, wherein:
(a) during step (a) of claim 8, the vibrator imparts a force of between approximately 400 lbs to 1,000 lbs. on said component to allow said component to be submerged in the filter bed.

10. A method as recited in claim 9, wherein:
(a) said component is an air grid including a horizontally extending air header and a plurality of horizontally extending air laterals connected to the horizontally extending air header and step (e) of claim 1 is performed such that the horizontally extending air header and each of the plurality of horizontally extending air laterals are positioned below an upper portion of the filter bed.

11. A method as recited in claim 1, further including the steps of:
(a) providing an underdrain beneath the filter bed for directing a fluid upwardly through said filter bed; and,
(b) during step (d) in claim 1, directing a fluid from said underdrain upwardly at subfluidization velocity.

\* \* \* \* \*